No. 698,213. Patented Apr. 22, 1902.
J. A. McGARRY.
WAGON TRUCK.
(Application filed Jan. 29, 1902.)
(No Model.)

Witnesses
Edward T. Wray
Homer L. Kraft

Inventor
John A. McGarry
by Parker Carter
Attorneys

THE NORRIS PETERS CO., PHOTO-LITHO., WASHINGTON, D. C.

UNITED STATES PATENT OFFICE.

JOHN A. McGARRY, OF CHICAGO, ILLINOIS.

WAGON-TRUCK.

SPECIFICATION forming part of Letters Patent No. 698,213, dated April 22, 1902.

Application filed January 29, 1902. Serial No. 91,741. (No model.)

*To all whom it may concern:*

Be it known that I, JOHN A. MCGARRY, a citizen of the United States, residing at Chicago, in the county of Cook and State of Illinois, have invented a certain new and useful Improvement in Wagon-Trucks, of which the following is a specification.

My invention relates to wagon-trucks, and particularly to such a truck as is intended to be used wholly or in part separate from any other truck. It has reference to methods of supporting the platform or body associated with such truck in proper horizontal position and locking or braking the wheels to prevent such truck from moving about.

My invention is illustrated in the accompanying drawings in connection with the rear truck of a lumber-hauling outfit; but it will be readily understood that it is applicable to many other uses and is, in fact, applicable to the ordinary hand-cart.

Figure 1:
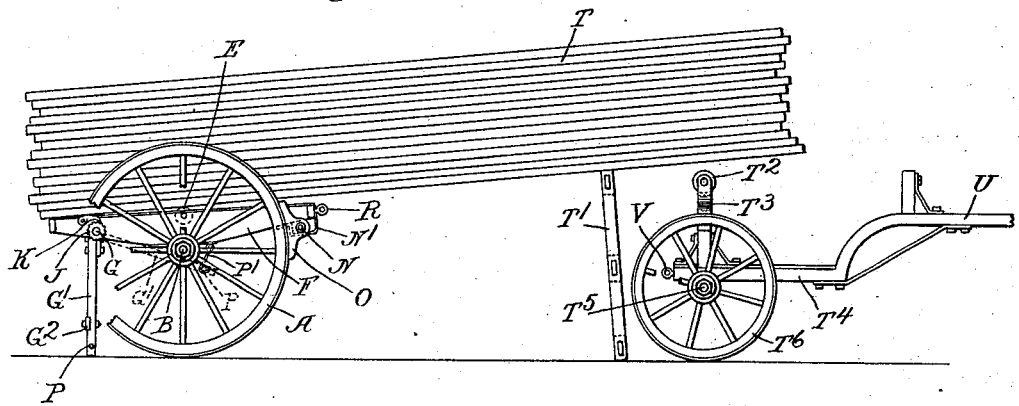
Figure 2:
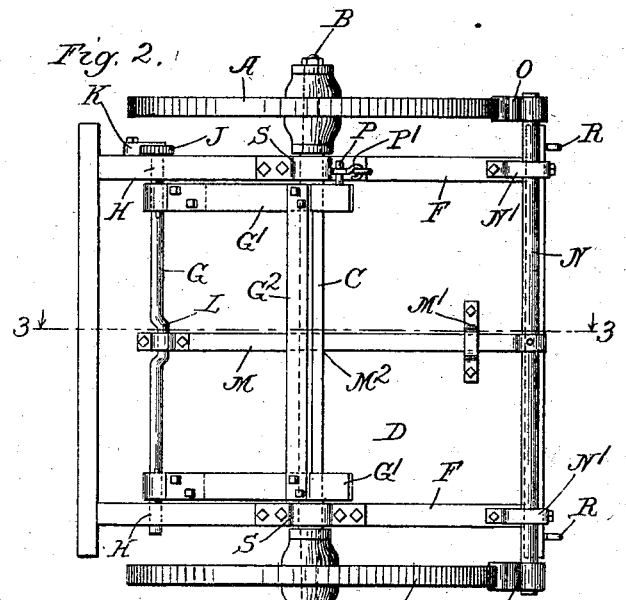
Figure 3:
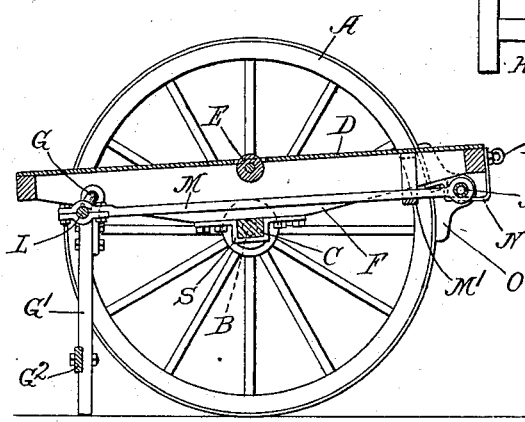

Figure 1 is a side elevation of my invention with other parts associated therewith. Fig. 2 is a bottom view of the truck. Fig. 3 is a longitudinal section on line 3 3, Fig. 2.

Like parts are indicated by the same letter in all the figures.

A A are the wheels of the truck in question, mounted on the spindles B B, which project from the ends of the fixed axle C on the bottom of the platform or body D. E is a roller mounted in this body and running across and projecting slightly above the surface. In this particular instance the side bars F are formed on the bottom and the axle is supported in part thereby or thereon. G is a rod forming the upper portion of the frame, which has downwardly-depending pieces G' G' and a lower cross-bar $G^2$, which is journaled in the side bars F F at H H. The rod G is provided with a ratchet-wheel J, associated with the dog K, which prevents the rod G from rotating and its associated frame from swinging in one direction, but leaves both free to swing in the other direction. In the case here illustrated the rod G about midway of the bottom is bent so as to form an eccentric loop L, which is journaled in the end of a longitudinal bar M. This bar is carried along the bottom of the body of the platform in any desired manner by any suitable guides—as, for example, the guide M', which may pass through or otherwise be associated in any convenient manner with the axle C at $M^2$ and is attached at its forward end to the rod N. This rod N is supported in the loops N' N' in the forward ends of the side bars F F, so as to have free motion backward and forward with the bar M as the latter is reciprocated by the action of the eccentric L. This rod N carries at its outer extremities the brake-shoes O O, which are set upon the wheels A A when the rod is in one position and which are free therefrom when the rod is in another position. One of the downwardly-projecting pieces G' is provided with a lateral pin P, which is engaged by the swinging hook P', so as to hold the frame up under the bottom or bed of the truck when it is folded up in the position indicated in Fig. 2 and indicated in dotted lines in Fig. 1. R R are eyes at the forward end of the body on the truck. The axle is preferably secured in position by the loops S, attached to the bottom of the side bars or frame-pieces F F. It is obvious that these several parts can be very greatly altered without departing from the spirit of my invention. I have arranged the swinging frame so that it moves the brake rod or "beam" N, as it may be called in this case, positively in both directions; but it is evident that it may be moved positively in one direction and by a spring action in the other. I only say this with regard to this particular feature for the purpose of suggesting that the same language is applicable to other features and to indicate that my drawings are to be taken in a very important sense as merely diagrammatic or suggestive and not as final or conclusive as to the form, proportions, shapes, or arrangements of the several parts.

In this particular case I have illustrated my invention as applied in connection with a lumber-hauling device.

T is a load of lumber supported on the "buck" T', as it is called. This is a temporary device. The forward truck is composed of a roller $T^2$, mounted on the standards, one shown as $T^3$, on the truck-frame $T^4$, supported by the axle $T^5$ on the wheels, one shown as $T^6$. U is the tongue or shafts, as the case may be, by which this forward truck is guided or carried or drawn. V is one of two eyes in the rear of the forward-truck frame. These parts are simply shown to facilitate the description of this particular application of my invention and not to indicate that it need always be used with a forward truck.

The use and operation of my invention are as follows: Having regard to the operation of the invention proper or its application to what in this case is called the "rear truck" of a lumber-wagon, it will be readily observed that when the frame G G' G² is moved down into the position shown in Fig. 3 two results immediately follow. One is that the end of the truck is supported so that its body portion is held in a substantially horizontal position, and the other is that by the action of the eccentric loop L the bar M is drawn toward the left and the brake-shoes O O are set upon the wheels to lock them in position. Thus by a single motion and with this single apparatus these trucks or wheels are locked in position and the body held horizontal. The importance of this will be obvious at a glance; but in connection with lumber-wagons it has a peculiar importance. It is the practice in lumber-yards to have such loose trucks to move them near to the pile of lumber, place the buck T' in front and at a suitable distance from the trucks, and then pile up the lumber in the form indicated in Fig. 1. This action of piling up is facilitated somewhat by the roller E; but it also has another purpose, to be explained later on. There is difficulty, of course, unless the wheels are thoroughly blocked in position, and it is the common practice to do this by breaking up lumber and putting pieces in front of and behind both wheels. When this is done, the wheels are kept from moving about; but the platform, which of course is free to rotate on the wheels, is not held in position, and it must be propped into position. My device accomplishes both these results. Without any difficulty at all and without any destruction of the lumber the process can be carried on as far as indicated in Fig. 1. The loaders have now finished their work and the teams return. The team is brought into position and the forward trucks backed under the load, as indicated in Fig. 1, until the buck T' is pushed out of position and the forward end of the load of lumber drops down upon the roller T². Chains are now quickly thrown around the load and attached to the eyes R and V, whereby everything is securely fastened together and the load can be hauled off. When now the load has been hauled to the other portion of the yard or up to the car or onto the dock where the lumber is to be unloaded, the chains are loosened, the horses are started, and the forward trucks are pulled out from under the mass of lumber, this action being facilitated by the roller T². At the same time the pressure of the rear portion of the load of lumber as the latter begins to descend in front is exerted to force the rear trucks out, and they are pushed backwardly, and the whole load of lumber drops to the ground, this action being facilitated by the cross-roller E in the rear truck. Of course this roller E would not be used in other cases. It is understood, of course, that the frame G G' G² has been moved up into the position shown in dotted lines, where it is held by the latch or hook P', and it will also be understood that when the frame falls down into the position shown in full lines in Figs. 1 and 3 the dog K engages the ratchet-wheel J and locks the parts in that position until the load has been built up and preferably until the chains have been fastened around to hold the two trucks together.

I have used the term "framework" to indicate that portion of the truck which is supported upon the wheels and serves to carry the load, and I have used the words "supporting-frame" to indicate that folding part or frame which is intended to fold down from the framework and reach the ground or floor, and thus support the framework in a comparatively horizontal position.

I claim—

1. A truck, consisting of wheels, a body portion, a folding supporting-frame at one end of the body portion, a brake-beam and brake-shoes at the other end, a bar connected to said brake-beam, and an eccentric connection between said bar and the folding frame, whereby when the latter is folded the bar is moved and the brakes set or freed as the case may be.

2. A truck, consisting of wheels, a body portion mounted thereon, a supporting-frame at one end thereof, a bar whereby such supporting-frame is pivoted to the truck, an eccentric loop in said bar, a rod connected therewith, a brake-beam and brake-shoes at the other end of the truck, and a connection from the same to said bar, so that when the supporting-frame is lowered the brake-shoes are set and when the supporting-frame is folded up out of position the brake-shoes are freed from the wheels.

3. A truck, consisting of wheels, a body portion, a folding supporting-frame at one end of the body portion, a brake-beam and brake-shoes at the other end, a bar connected to said brake-beam, an eccentric connection between said bar and the folding frame, whereby when the latter is folded the bar is moved and the brakes set or freed as the case may be, and a locking device to lock the supporting-frame down in its supporting position.

4. A truck, consisting of wheels, a body portion mounted thereon, a supporting-frame at one end thereof, a bar whereby such supporting-frame is pivoted to the truck, an eccentric loop in said bar, a rod connected therewith, a brake-beam and brake-shoes at the other end of the truck, a connection from the same to said bar, so that when the supporting-frame is lowered the brake-shoes are set and when the supporting-frame is folded up out of position the brake-shoes are freed from the wheels, and a locking device to lock the supporting-frame down in its supporting position.

5. A truck, consisting of wheels, a body portion, a folding supporting-frame at one end of the body portion, a brake-beam and brake-shoes at the other end, a bar connected to said brake-beam, an eccentric connection between said bar and the folding frame, whereby when the latter is folded the bar is moved and the brakes set or freed as the case may be, and a locking device to lock the supporting-frame up in its idle position.

6. A truck, consisting of wheels, a body portion mounted thereon, a supporting-frame at one end thereof, a bar whereby such supporting-frame is pivoted to the truck, an eccentric loop in said bar, a rod connected therewith, a brake-beam and brake-shoes at the other end of the truck, a connection from the same to said bar, so that when the supporting-frame is lowered the brake-shoes are set and when the supporting-frame is folded up out of position the brake-shoes are freed from the wheels, and a locking device to lock the supporting-frame up in its idle position.

7. A truck comprising wheels, a framework mounted on said wheels, a supporting-frame attached to said framework and adapted to be folded down into a vertical position to engage the ground and to hold the framework from rotating on or with the wheels, and brake-shoes on the framework and connected with the supporting-frame so that when the latter is moved into position to support the framework the brake-shoes are correspondingly moved to engage the wheels.

8. A truck comprising wheels, a frame supported on said wheels, a supporting-frame attached to said framework on one side of said wheels, brake-shoes attached to said framework on the opposite side of said wheels and a connection from the supporting-frame to said brake-shoes whereby when the framework is moved into position the brake-shoes are correspondingly operated.

9. A truck comprising wheels, a framework mounted on said wheels, a supporting-frame pivoted to said framework so as to fold thereon or project therefrom and engage the ground, brake-shoes supported on the framework and a connection from the brake-shoes to the supporting-frame so that when the latter is folded into position to support the framework the brake-shoes are correspondingly operated to engage the wheels.

10. A truck, comprising a pair of wheels, a framework pivotally mounted thereon, a folding frame attached to the framework and adapted to fold down so as to engage the ground and with the wheels support the framework in a substantially horizontal position, brake-shoes adapted to engage the wheels when the supporting-frame is in engagement with the ground, and connections from the brake-shoes to such supporting-frame, so that when the latter is operated the former are set.

JOHN A. McGARRY.

Witnesses:
FANNY B. FAY,
HOMER L. KRAFT.